(12) United States Patent
Palmer

(10) Patent No.: US 10,445,015 B2
(45) Date of Patent: *Oct. 15, 2019

(54) UNIFORM SYSTEM WIDE ADDRESSING FOR A COMPUTING SYSTEM

(71) Applicant: Friday Harbor LLC, New York, NY (US)

(72) Inventor: Douglas A. Palmer, San Diego, CA (US)

(73) Assignee: Friday Harbor LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,111

(22) Filed: Aug. 27, 2018

(65) Prior Publication Data

US 2019/0138237 A1   May 9, 2019

Related U.S. Application Data

(63) Continuation of application No. 14/608,489, filed on Jan. 29, 2015, now Pat. No. 10,061,531.

(51) Int. Cl.
*G06F 3/00* (2006.01)
*G06F 13/00* (2006.01)
(Continued)

(52) U.S. Cl.
CPC .......... *G06F 3/0647* (2013.01); *G06F 3/067* (2013.01); *G06F 3/0613* (2013.01); *G06F 13/102* (2013.01); *G06F 15/17362* (2013.01)

(58) Field of Classification Search
CPC ...... G06F 3/0647; G06F 3/0613; G06F 3/067; G06F 13/102
(Continued)

(56) References Cited

U.S. PATENT DOCUMENTS 4,797,652 A   1/1989 Hall
4,860,201 A   8/1989 Stolfo
(Continued)

FOREIGN PATENT DOCUMENTS

WO   1992002866   2/1992
WO   1993020552   10/1993
(Continued)

OTHER PUBLICATIONS

Eichner et al., "Neural Simulations on Multi-Core Architectures", Frontiers in Neuroinformatics, vol. 3, Article 21, Jul. 9, 2009, pp. 1-15.
(Continued)

*Primary Examiner* — Farley Abad
*Assistant Examiner* — Henry W Yu
(74) *Attorney, Agent, or Firm* — Sheppard Mullin Richter & Hampton LLP

(57) ABSTRACT

A computing system may comprise a plurality of processing devices. In one example, a processing device may comprise a top level router, a device controller and a plurality of processing engines grouped in a plurality of clusters. The top level router may comprise a plurality of high speed communication interfaces to couple the processing device with other processing devices. The device controller may comprise a device controller memory space. Each cluster may have a cluster memory. Each processing engine may comprise an engine memory. The device controller memory space, the cluster memory of all clusters and the engine memory of all processing engines of all processing devices may form a uniform address space for the computing system, which may be addressed using a packet that contains a single destination address in a header of the packet.

20 Claims, 8 Drawing Sheets

(51) Int. Cl.
*G06F 13/12* (2006.01)
*G01R 31/08* (2006.01)
*H04L 12/26* (2006.01)
*H04L 12/28* (2006.01)
*H04J 3/24* (2006.01)
*G06F 3/06* (2006.01)
*G06F 15/173* (2006.01)
*G06F 13/10* (2006.01)

(58) Field of Classification Search
USPC ....... 710/3–4, 33, 74; 712/19; 370/218, 252, 370/389, 392, 419, 474, 476
See application file for complete search history.

(56) References Cited

U.S. PATENT DOCUMENTS

| | | | |
|---|---|---|---|
| 4,974,169 A | 11/1990 | Engel |
| 5,161,156 A | 11/1992 | Baum |
| 5,224,100 A | 6/1993 | Lee |
| 5,285,524 A | 2/1994 | Cok |
| 5,325,464 A | 6/1994 | Pechanek |
| 5,765,200 A | 6/1998 | McIlvain |
| 6,085,233 A | 7/2000 | Jeffrey |
| 6,513,108 B1 | 1/2003 | Kerr |
| 6,735,773 B1 | 5/2004 | Trinh |
| 6,917,915 B2 | 7/2005 | Du |
| 6,965,615 B1 | 11/2005 | Kerr |
| 7,215,637 B1 | 5/2007 | Ferguson |
| 7,401,169 B2 | 7/2008 | Holbrook |
| 7,685,409 B2 | 3/2010 | Du |
| 7,746,862 B1 | 6/2010 | Zuk |
| 8,126,828 B2 | 2/2012 | Snook |
| 8,484,307 B2 | 7/2013 | Arimilli |
| 8,583,648 B1 | 11/2013 | Majkowska |
| 8,655,815 B2 | 2/2014 | Palmer |
| 8,848,726 B1 | 9/2014 | Palmer |
| 8,954,700 B2 | 2/2015 | Ansari |
| 9,025,457 B2 | 5/2015 | Yamaguchi |
| 9,185,057 B2 | 11/2015 | Palmer |
| 9,294,097 B1 | 3/2016 | Vassiliev |
| 2002/0073348 A1 | 6/2002 | Tani |
| 2002/0083297 A1 | 6/2002 | Modelski |
| 2003/0037194 A1 | 2/2003 | Mukherjee |
| 2003/0231627 A1 | 12/2003 | John |
| 2004/0030745 A1 | 2/2004 | Boucher |
| 2004/0037322 A1 | 2/2004 | Sukonik |
| 2004/0098490 A1 | 5/2004 | Dinker |
| 2005/0204058 A1 | 9/2005 | Philbrick |
| 2006/0010144 A1 | 1/2006 | Lawrence |
| 2006/0023719 A1 | 2/2006 | Sindhu |
| 2007/0011118 A1 | 1/2007 | Snook |
| 2007/0022063 A1 | 1/2007 | Lightowler |
| 2007/0121499 A1 | 5/2007 | Pal |
| 2007/0217559 A1 | 9/2007 | Stott |
| 2007/0296459 A1 | 12/2007 | Kelem |
| 2008/0077921 A1 | 3/2008 | Chaudhary |
| 2008/0198706 A1 | 8/2008 | Wu |
| 2008/0215514 A1 | 9/2008 | Morgan |
| 2010/0095088 A1 | 4/2010 | Vorbach |
| 2010/0115236 A1 | 5/2010 | Bataineh |
| 2010/0161533 A1 | 6/2010 | Snook |
| 2010/0269027 A1 | 10/2010 | Arimilli |
| 2010/0312735 A1 | 12/2010 | Knoblauch |
| 2011/0083000 A1 | 4/2011 | Rhoades |
| 2011/0161625 A1 | 6/2011 | Pechanek |
| 2011/0219035 A1 | 9/2011 | Korsunsky |
| 2011/0261705 A1 | 10/2011 | Kamerkar |
| 2011/0289034 A1 | 11/2011 | Palmer |
| 2011/0313961 A1 | 12/2011 | Toscano |
| 2011/0314233 A1 | 12/2011 | Yan |
| 2012/0066372 A1 | 3/2012 | Jennings |
| 2012/0075319 A1 | 3/2012 | Dally |
| 2012/0177050 A1 | 7/2012 | Fujimoto |
| 2012/0179896 A1 | 7/2012 | Salapura |
| 2012/0240185 A1 | 9/2012 | Kapoor |
| 2012/0320921 A1 | 12/2012 | Barnes |
| 2013/0242831 A1 | 9/2013 | Vannithamby |
| 2013/0250954 A1 | 9/2013 | Sano |
| 2014/0032457 A1 | 1/2014 | Palmer |
| 2014/0068625 A1 | 3/2014 | Winser |
| 2014/0156907 A1 | 6/2014 | Palmer |
| 2014/0172763 A1 | 6/2014 | Palmer |
| 2014/0281429 A1 | 9/2014 | Brown |
| 2014/0304399 A1 | 10/2014 | Chaudhary |
| 2014/0310467 A1 | 10/2014 | Shalf |
| 2014/0317221 A1 | 10/2014 | Froening |
| 2015/0124805 A1 | 5/2015 | Yadav |

FOREIGN PATENT DOCUMENTS

| | | |
|---|---|---|
| WO | 2004042570 | 5/2004 |
| WO | 2014062265 | 4/2014 |
| WO | 2014089259 | 6/2014 |

OTHER PUBLICATIONS

Frank et al., "An Accelerator for Neural Networks with Pulse-Coded Model Neurons", IEEE Transactions on Neural Networks, vol. 10, No. 3, May 1999, pp. 527-538.

International Application No. PCT/US2016/015483, Notification of Transmittal of the International Search Report and the Written Opinion of the International Searching Authority, dated Apr. 28, 2016, 23 pages.

International Search Report and Written Opinion for International Application No. PCT/US2016/015078, dated May 18, 2016, 11 pages.

Kim et al. "Mapping of Neural Networks Onto the Memory-Processor Integrated Architecture", Neural Networks, vol. 11, No. 6, Aug. 1998, pp. 1083-1098.

Purnaprajna et al., "Using Run-Time Reconfiguration for Energy Savings in Parallel Data Processing", Proceedings of the International Conference on Engineering of Reconfigurable Systems and Algorithms, Jul. 13, 2009, 7 pages.

Rast et al., Virtual Synaptic Interconnect Using an Asynchronous Network-On-Chip, Proceedings of the 2008 IEEE International Joint Conference on Neural Networks (IJCNN 2008), Jun. 1, 2008, pp. 2727-2737.

Schaefer et al., "Simulation of Spiking Neural Networks—Architectures and Implementations", Neurocomputing, vol. 18, 2002, pp. 647-679.

UNIFORM SYSTEM WIDE ADDRESSING FOR A COMPUTING SYSTEM

FIELD OF THE DISCLOSURE

The systems, methods and apparatuses described herein relate to a computing system having a plurality of multi-core processors and a uniform resource addressing across the computing system.

BACKGROUND

A typical modern computing system demands a lot of computing power that can only be provided by a lot of computing modules combined with each computing module having one or more computer processors. For example, a computing system for a data center typically includes racks of computing modules stacked together. Such a conventional computing system uses at least two completely separate addressing schemes: one addressing scheme used by a computer processor to access a main memory such as physical or virtual memory addressing used in a traditional von Neumann or Harvard architecture, and another addressing scheme used for inter-module communication such as packet switching based Gigabit Ethernet.

The heterogeneous addressing schemes of the modern computing system do not provide a high scalability because of complexity of addressing remote memory and the need for extra software to use remote memory, leading to higher latency and lower bandwidth when working with remote memory. With ever increasing demand on computing power, there is a need in the art for a scalable computing system that implements a system wide uniform addressing across computing modules that combines simplicity, ease of routing and flexibility to scale while maintaining low latency, high-bandwidth communication across the system, regardless of the size of the computing system.

SUMMARY

The present disclosure provides systems, methods and apparatuses for operating a computing system. In one aspect of the disclosure, a processing device according to the present disclosure may comprise one or more high speed communication interfaces to communicate data to other devices external of the processing device, a top level router on the processing device coupled to the one or more high speed communication interfaces, a device controller, and a plurality of processing engines. The plurality of processing engines may be grouped in a plurality of clusters with each cluster comprising a subset of the plurality of the processing engines. The device controller may comprise a microcontroller and a device controller memory space. Each cluster may comprise a cluster controller and one or more cluster memories in addition to the processing engines. Each cluster memory may comprise a memory controller and each processing engine may comprise an engine memory and an engine core. The device controller memory space, the cluster memory of all clusters of the processing device and the engine memory of all processing engines may form a uniform address space on the processing device. The microcontroller of the device controller, each cluster controller, the memory controller of each cluster memory and each processing engine may be configured to address any memory location within the uniform address space using a packet that contains a single destination address in a header of the packet.

In another aspect of the disclosure, a computing system according to the present disclosure may comprise a plurality of processing devices. Each processing device may comprise one or more high speed communication interfaces for communication with outside of the processing device, a top level router on the processing device coupled to the one or more high speed communication interfaces, a device controller, and a plurality of processing engines. The plurality of processing engines on each processing devices may be grouped in a plurality of clusters with each cluster comprising a subset of the plurality of the processing engines. The device controller of each processing device may comprise a microcontroller and a device controller memory space. Each cluster of each processing device may have a cluster controller and one or more cluster memories in addition to the processing engines. Each cluster memory may comprise a memory controller and each processing engine of each processing device may comprise an engine memory and an engine core. The device controller memory space of all processing devices, the cluster memory of all clusters of all processing devices and the engine memory of all processing engines of all processing devices may form a uniform address space for the computing system. The microcontroller of each device controller, each cluster controller, the memory controller of each cluster memory and each processing engine may be configured to address any memory location within the uniform address space using a packet that contains a single destination address in a header of the packet.

In yet another aspect, the present disclosure may provide a computer-implemented method for addressing a computing resource in a computing system using a packet. The method may comprise generating a packet at a source computing resource of the computing system, which may comprise a plurality of processing devices. Each processing device may comprise a top level router on the processing device that is coupled to a plurality of high speed communication interfaces to couple the processing device with other processing devices of the computing system, a device controller coupled to the top level router to control operation of the top level router, and a plurality of clusters of processing engines. The device controller may comprise a microcontroller and a device controller memory space. Each cluster may have a cluster controller, one or more cluster memories and a plurality of processing engines. Each processing engine may comprise an engine memory and an engine core. The source processing device may be one of: a microcontroller of the device controller of one of the plurality of processing devices, a cluster controller of a cluster of one of the plurality of processing devices, a memory controller of a cluster of one of the plurality of processing devices, or a processing engine. The computer-implemented method may further comprise transmitting the packet to a router, determining a route for the packet at the router, and routing the packet to its destination computing resource of the computing system. The packet may contain a single destination address in a header of the packet and the route may be determined based on the single destination address. The destination address may point to an address location in a uniform address space of the computing system, which may comprise the device controller memory space of each of the plurality of processing devices, the cluster memory of all clusters of each of the plurality of processing devices and the engine memory of all processing engines of each of the plurality of processing devices.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order to avoid unnecessarily obscuring the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1A:
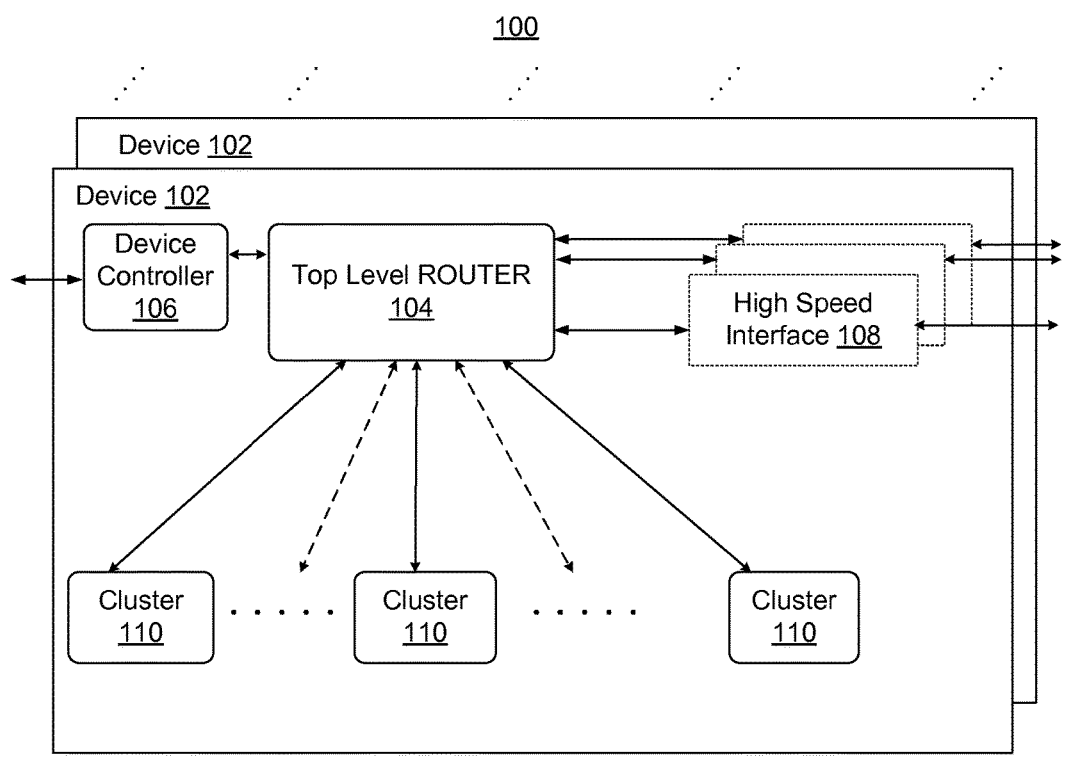
FIG. 1A is a block diagram of an exemplary computing system according to the present disclosure.

FIG. 1A shows an exemplary computing system 100 according to the present disclosure. The computing system 100 may comprise at least one processing device 102. A typical computing system 100, however, may comprise a plurality of processing devices 102. Each processing device 102, which may also be referred to as device 102, may comprise a router 104, a device controller 106, a plurality of high speed interfaces 108 and a plurality of clusters 110. The router 104 may also be referred to as a top level router or a level one router. Each cluster 110 may comprise a plurality of processing engines to provide computational capabilities for the computing system 100. The high speed interfaces 108 may comprise communication ports to communicate data outside of the device 102, for example, to other devices 102 of the computing system 100 and/or interfaces to other computing systems. Unless specifically expressed otherwise, data as used herein may refer to both program code and pieces of information upon which the program code operates.

In some implementations, the processing device 102 may include 2, 4, 8, 16, 32 or another number of high speed interfaces 108. Each high speed interface 108 may implement a physical communication protocol. In one non-limiting example, each high speed interface 108 may implement the media access control (MAC) protocol, and thus may have a unique MAC address associated with it. The physical communication may be implemented in a known communication technology, for example, Gigabit Ethernet, or any other existing or future-developed communication technology. In one non-limiting example, each high speed interface 108 may implement bi-directional high-speed serial ports, such as 10 Giga bits per second (Gbps) serial ports. Two processing devices 102 implementing such high speed interfaces 108 may be directly coupled via one pair or multiple pairs of the high speed interfaces 108, with each pair comprising one high speed interface 108 on one processing device 102 and another high speed interface 108 on the other processing device 102.

Figure 5:
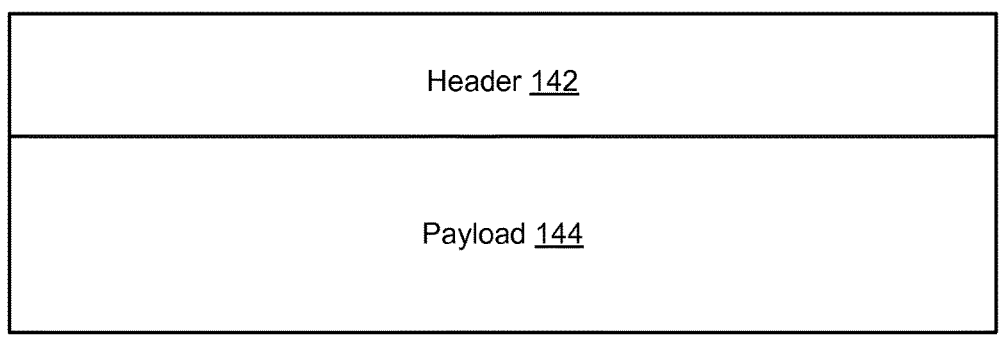
FIG. 5 is a block diagram of an exemplary packet according to the present disclosure.

Data communication between different computing resources of the computing system 100 may be implemented using routable packets. The computing resources may comprise device level resources such as a device controller 106, cluster level resources such as a cluster controller or cluster memory controller, and/or the processing engine level resources such as individual processing engines and/or individual processing engine memory controllers. An exemplary packet 140 according to the present disclosure is shown in FIG. 5. The packet 140 may comprise a header 142 and a payload 144. The header 142 may include a routable destination address for the packet 140. The router 104 may be a top-most router configured to route packets on each processing device 102. The router 104 may be a programmable router. That is, the routing information used by the router 104 may be programmed and updated. In one non-limiting embodiment, the router 104 may be implemented using an address resolution table (ART) or Look-up table (LUT) to route any packet it receives on the high speed interfaces 108, or any of the internal interfaces interfacing the device controller 106 or clusters 110. For example, depending on the destination address, a packet 140 received from one cluster 110 may be routed to a different cluster 110 on the same processing device 102, or to a different processing device 102; and a packet 140 received from one high speed interface 108 may be routed to a cluster 110 on the processing device or to a different processing device 102.

The device controller 106 may control the operation of the processing device 102 from power on through power down. The device controller 106 may comprise a device controller processor, one or more registers and a device controller memory space. The device controller processor may be any existing or future-developed microcontroller. In one embodiment, for example, an ARM® Cortex M0 microcontroller may be used for its small footprint and low power consumption. In another embodiment, a bigger and more powerful microcontroller may be chosen if needed. The one or more registers may include one to hold a device identifier (DEVID) for the processing device 102 after the processing device 102 is powered up. The DEVID may be used to uniquely identify the processing device 102 in the computing system 100. In one non-limiting embodiment, the DEVID may be loaded on system start from a non-volatile storage, for example, a non-volatile internal storage on the processing device 102 or a non-volatile external storage. The device controller memory space may include both read-only memory (ROM) and random access memory (RAM). In one non-limiting embodiment, the ROM may store bootloader code that during a system start may be executed to initialize the processing device 102 and load the remainder of the boot code through a bus from outside of the device controller 106. The instructions for the device controller processor, also referred to as the firmware, may reside in the RAM after they are loaded during the system start.

The registers and device controller memory space of the device controller 106 may be read and written to by computing resources of the computing system 100 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet may include a destination address such as DEVID:PADDR, of which the DEVID may identify the processing device 102 and the PADDR may be an address for a register of the device controller 106 or a memory location of the device controller memory space of a processing device 102. In some embodiments, a packet directed to the device controller 106 may have a packet operation code, which may be referred to as packet opcode or just opcode to indicate what operation needs to be performed for the packet. For example, the packet operation code may indicate reading from or writing to the storage location pointed to by PADDR. It should be noted that the device controller 106 may also send packets in addition to receiving them. The packets sent by the device controller 106 may be self-initiated or in response to a received packet (e.g., a read request). Self-initiated packets may include for example, reporting status information, requesting data, etc.

Figure 1B:
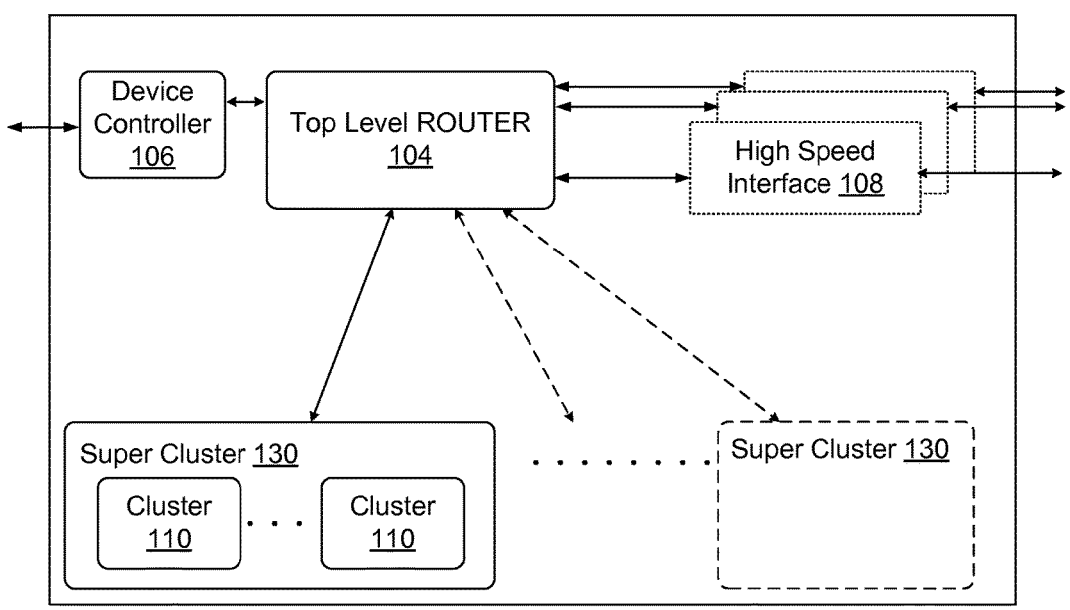
FIG. 1B is a block diagram of an exemplary processing device according to the present disclosure.

In one embodiment, a plurality of clusters 110 on a processing device 102 may be grouped together. FIG. 1B shows a block diagram of another exemplary processing device 102A according to the present disclosure. The exemplary processing device 102A is one particular embodiment of the processing device 102. Therefore, the processing device 102 referred to in the present disclosure may include any embodiments of the processing device 102, including the exemplary processing device 102A. As shown on FIG. 1B, a plurality of clusters 110 may be grouped together to form a super cluster 130 and an exemplary processing device 102A may comprise a plurality of such super clusters 130. In one embodiment, a processing device 102 may include 2, 4, 8, 16, 32 or another number of clusters 110, without further grouping the clusters 110 into super clusters. In another embodiment, a processing device 102 may include 2, 4, 8, 16, 32 or another number of super clusters 130 and each super cluster 130 may comprise a plurality of clusters.

Figure 2A:
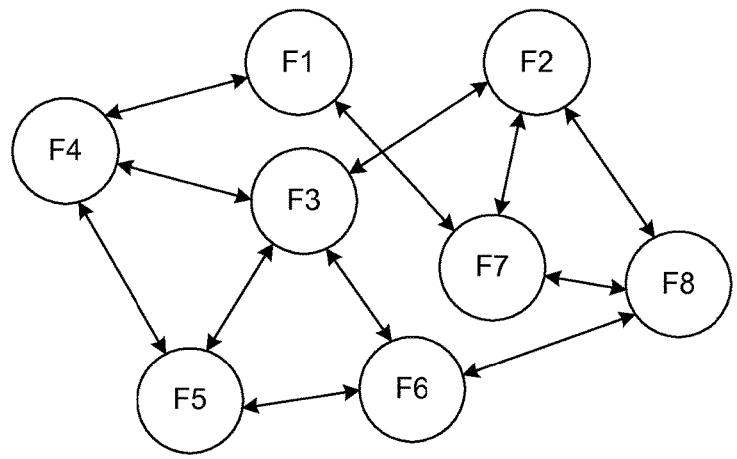
FIG. 2A is a block diagram of topology of connections of an exemplary computing system according to the present disclosure.

FIG. 2A shows a block diagram of an exemplary computing system 100A according to the present disclosure. The computing system 100A may be one exemplary embodiment of the computing system 100 of FIG. 1A. The computing system 100A may comprise a plurality of processing devices 102 designated as F1, F2, F3, F4, F5, F6, F7 and F8. As shown in FIG. 2A, each processing device 102 may be directly coupled to one or more other processing devices 102. For example, F4 may be directly coupled to F1, F3 and F5; and F7 may be directly coupled to F1, F2 and F8. Within computing system 100A, one of the processing devices 102 may function as a host for the whole computing system 100A. The host may have a unique device ID that every processing devices 102 in the computing system 100A recognizes as the host. For example, any processing devices 102 may be designated as the host for the computing system 100A. In one non-limiting example, F1 may be designated as the host and the device ID for F1 may be set as the unique device ID for the host.

In another embodiment, the host may be a computing device of a different type, such as a computer processor known in the art (for example, an ARM® Cortex or Intel® x86 processor) or any other existing or future-developed processors. In this embodiment, the host may communicate with the rest of the system 100A through a communication interface, which may represent itself to the rest of the system 100A as the host by having a device ID for the host.

The computing system 100A may implement any appropriate techniques to set the DEVIDs, including the unique DEVID for the host, to the respective processing devices 102 of the computing system 100A. In one exemplary embodiment, the DEVIDs may be stored in the ROM of the respective device controller 106 for each processing devices 102 and loaded into a register for the device controller 106 at power up. In another embodiment, the DEVIDs may be loaded from an external storage. In such an embodiment, the assignments of DEVIDs may be performed offline, and may be changed offline from time to time or as appropriate. Thus, the DEVIDs for one or more processing devices 102 may be different each time the computing system 100A initializes. Moreover, the DEVIDs stored in the registers for each device controller 106 may be changed at runtime. This runtime change may be controlled by the host of the computing system 100A. For example, after the initialization of the computing system 100A, which may load the pre-configured DEVIDs from ROM or external storage, the host of the computing system 100A may reconfigure the computing system 100A and assign different DEVIDs to the processing devices 102 in the computing system 100A to overwrite the initial DEVIDs in the registers of the device controllers 106.

Figure 2B:
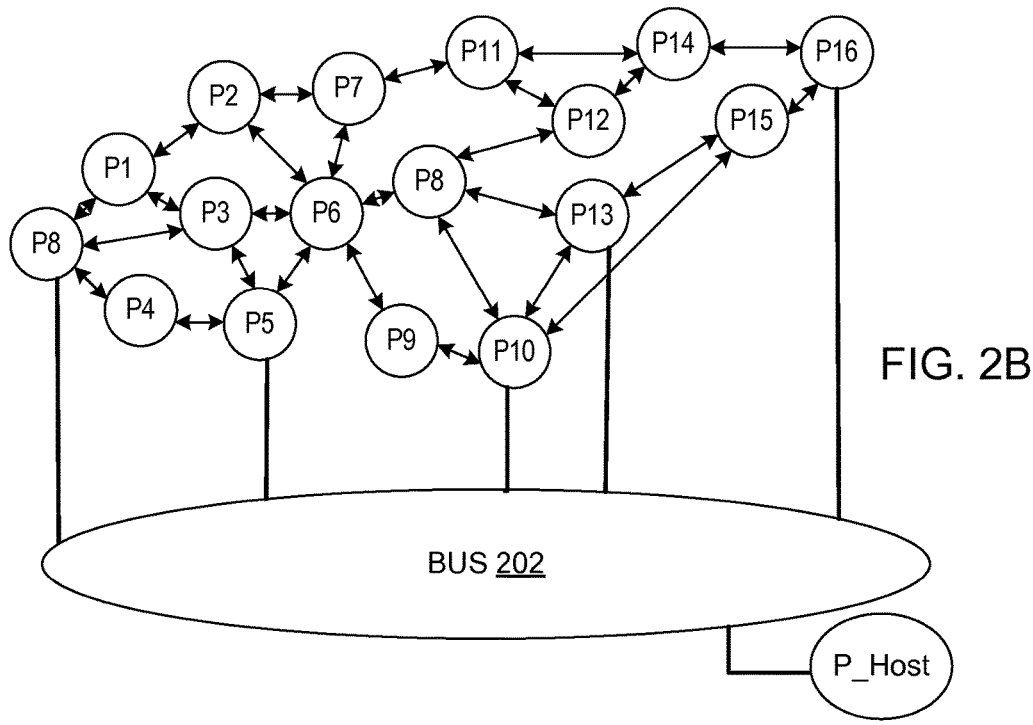
FIG. 2B is a block diagram of topology of connections of another exemplary computing system according to the present disclosure.

FIG. 2B is a block diagram of a topology of another exemplary system 100B according to the present disclosure. The computing system 100B may be another exemplary embodiment of the computing system 100 of FIG. 1 and may comprise a plurality of processing devices 102 (designated as P1 through P16 on FIG. 2B), a bus 202 and a processing device P_Host. Each processing device of P1 through P16 may be directly coupled to another processing device of P1 through P16 by a direct link between them. At least one of the processing devices P1 through P16 may be coupled to the bus 202. As shown in FIG. 2B, the processing devices P8, P5, P10, P13, P15 and P16 may be coupled to the bus 202. The processing device P_Host may be coupled to the bus 202 and may be designated as the host for the computing system 100B. In the exemplary system 100B, the host may be a computer processor known in the art (for example, an ARM® Cortex or Intel® x86 processor) or any other existing or future-developed processors. The host may communicate with the rest of the system 100B through a communication interface coupled to the bus and may represent itself to the rest of the system 100B as the host by having a device ID for the host.

Figure 3A:
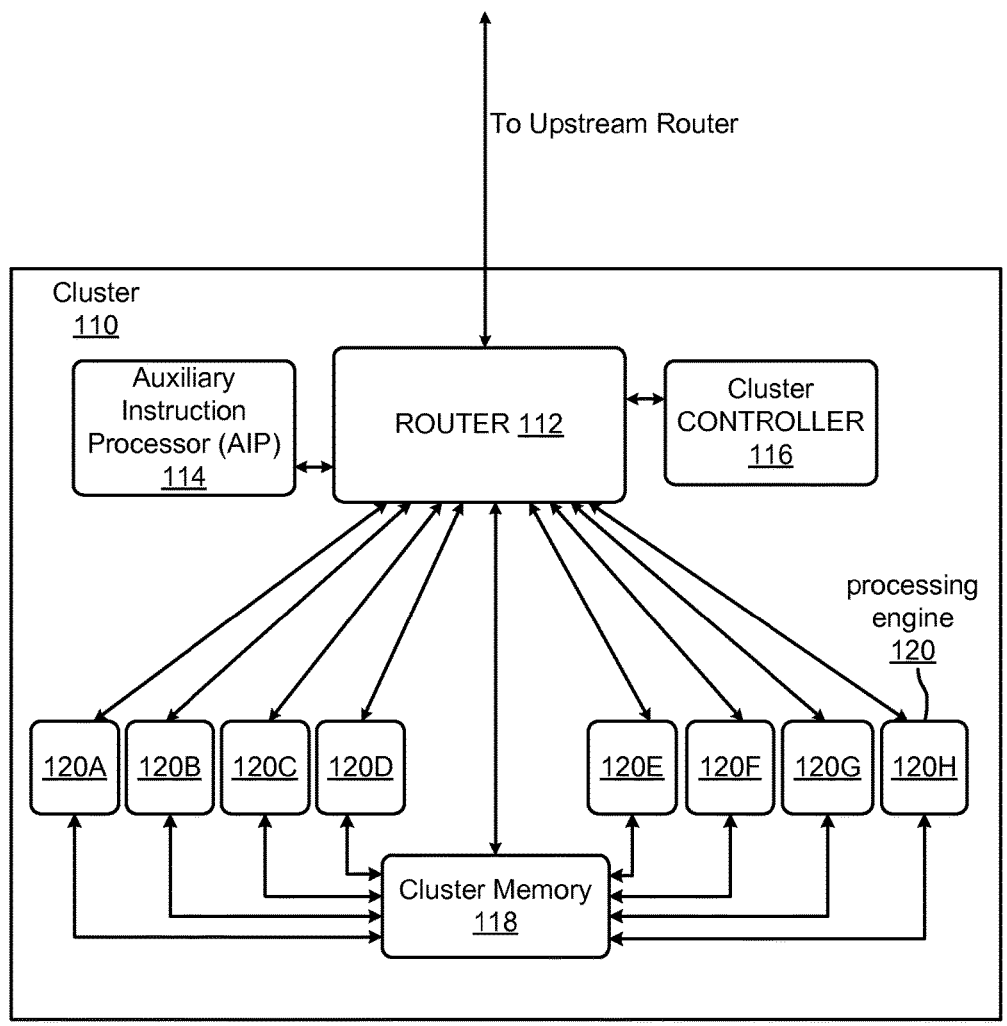
FIG. 3A is a block diagram of an exemplary cluster according to the present disclosure.

FIG. 3A shows a block diagram of an exemplary cluster 110 according to the present disclosure. The exemplary cluster 110 may comprise a router 112, a cluster controller 116, an auxiliary instruction processor (AIP) 114, a cluster memory 118 and a plurality of processing engines 120. The router 112 may be coupled to an upstream router to provide interconnection between the upstream router and the cluster 110. The upstream router may be, for example, the router 104 of the processing device 102 if the cluster 110 is not part of a super cluster 130.

The exemplary operations to be performed by the router 112 may include receiving a packet destined for a resource within the cluster 110 from outside the cluster 110 and/or transmitting a packet originating within the cluster 110 destined for a resource inside or outside the cluster 110. A resource within the cluster 110 may be, for example, the cluster memory 118 or any of the processing engines 120 within the cluster 110. A resource outside the cluster 110 may be, for example, a resource in another cluster 110 of the computer device 102, the device controller 106 of the processing device 102, or a resource on another processing device 102. In some embodiments, the router 112 may also transmit a packet to the router 104 even if the packet may target a resource within itself. In one embodiment, the router 104 may implement a loopback path to send the packet back to the originating cluster 110 if the destination resource is within the cluster 110.

The cluster controller 116 may send packets, for example, as a response to a read request, or as unsolicited data sent by hardware for error or status report. The cluster controller 116 may also receive packets, for example, packets with opcodes to read or write data. In one embodiment, the cluster controller 116 may be any existing or future-developed microcontroller, for example, one of the ARM® Cortex-M microcontroller and may comprise one or more cluster control registers (CCRs) that provide configuration and control of the cluster 110. In another embodiment, instead of using a microcontroller, the cluster controller 116 may be custom made to implement any functionalities for handling packets and controlling operation of the router 112. In such an embodiment, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

Each cluster memory 118 may be part of the overall addressable memory of the computing system 100. That is, the addressable memory of the computing system 100 may include the cluster memories 118 of all clusters of all devices 102 of the computing system 100. The cluster memory 118 may be a part of the main memory shared by the computing system 100. In some embodiments, any memory location within the cluster memory 118 may be addressed by any processing engine within the computing system 100 by a physical address. The physical address may be a combination of the DEVID, a cluster identifier (CLSID) and a physical address location (PADDR) within the cluster memory 118, which may be formed as a string of bits, such as, for example, DEVID:CLSID:PADDR. The DEVID may be associated with the device controller 106 as described above and the CLSID may be a unique identifier to uniquely identify the cluster 110 within the local processing device 102. It should be noted that in at least some embodiments, each register of the cluster controller 116 may also be assigned a physical address (PADDR). Therefore, the physical address DEVID:CLSID:PADDR may also be used to address a register of the cluster controller 116, in which PADDR may be an address assigned to the register of the cluster controller 116.

In some other embodiments, any memory location within the cluster memory 118 may be addressed by any processing engine within the computing system 100 by a virtual address. The virtual address may be a combination of a DEVID, a CLSID and a virtual address location (ADDR), which may be formed as a string of bits, such as, for example, DEVID:CLSID:ADDR. The DEVID and CLSID in the virtual address may be the same as in the physical addresses.

In one embodiment, the width of ADDR may be specified by system configuration. For example, the width of ADDR may be loaded into a storage location convenient to the cluster memory 118 during system start and/or changed from time to time when the computing system 100 performs a system configuration. To convert the virtual address to a physical address, the value of ADDR may be added to a base physical address value (BASE). The BASE may also be specified by system configuration as the width of ADDR and stored in a location convenient to a memory controller of the cluster memory 118. In one example, the width of ADDR may be stored in a first register and the BASE may be stored in a second register in the memory controller. Thus, the virtual address DEVID:CLSID:ADDR may be converted to a physical address as DEVID:CLSID:ADDR+BASE. Note that the result of ADDR+BASE has the same width as the longer of the two.

The address in the computing system 100 may be 8 bits, 16 bits, 32 bits, 64 bits, or any other number of bits wide. In one non-limiting example, the address may be 32 bits wide. The DEVID may be 10, 15, 20, 25 or any other number of bits wide. The width of the DEVID may be chosen based on the size of the computing system 100, for example, how many processing devices 102 the computing system 100 has or may be designed to have. In one non-limiting example, the DEVID may be 20 bits wide and the computing system 100 using this width of DEVID may contain up to $2^{20}$ processing devices 102. The width of the CLSID may be chosen based on how many clusters 110 the processing device 102 may be designed to have. For example, the CLSID may be 3, 4, 5, 6, 7, 8 bits or any other number of bits wide. In one non-limiting example, the CLSID may be 5 bits wide and the processing device 102 using this width of CLSID may contain up to $2^5$ clusters. The width of the PADDR for the cluster level may be 20, 30 or any other number of bits. In one non-limiting example, the PADDR for the cluster level may be 27 bits and the cluster 110 using this width of PADDR may contain up to $2^{27}$ memory locations and/or addressable registers. Therefore, in some embodiments, if the DEVID may be 20 bits wide, CLSID may be 5 bits and PADDR may have a width of 27 bits, a physical address DEVID:CLSID:PADDR or DEVID:CLSID:ADDR+BASE may be 52 bits.

For performing the virtual to physical memory conversion, the first register (ADDR register) may have 4, 5, 6, 7 bits or any other number of bits. In one non-limiting example, the first register may be 5 bits wide. If the value of the 5 bits register is four (4), the width of ADDR may be 4 bits; and if the value of 5 bits register is eight (8), the width of ADDR will be 8 bits. Regardless of ADDR being 4 bits or 8 bits wide, if the PADDR for the cluster level may be 27 bits then BASE may be 27 bits, and the result of ADDR+ BASE may still be a 27 bits physical address within the cluster memory 118.

FIG. 3A shows that a cluster 110 may comprise one cluster memory 118. In another embodiment, a cluster 110 may comprise a plurality of cluster memories 118 that each may comprise a memory controller and a plurality of memory banks, respectively. Moreover, in yet another embodiment, a cluster 110 may comprise a plurality of cluster memories 118 and these cluster memories 118 may be connected together via a router that may be downstream of the router 112.

The AIP 114 may be a special processing engine shared by all processing engines 120 of one cluster 110. In one example, the AIP 114 may be implemented as a coprocessor to the processing engines 120. For example, the AIP 114 may implement less commonly used instructions such as some floating point arithmetic, including but not limited to, one or more of addition, subtraction, multiplication, division and square root, etc. As shown in FIG. 3A, the AIP 114 may be coupled to the router 112 directly and may be configured to send and receive packets via the router 112. As a coprocessor to the processing engines 120 within the same cluster 110, although not shown in FIG. 3A, the AIP 114 may also be coupled to each processing engines 120 within the same cluster 110 directly. In one embodiment, a bus shared by all the processing engines 120 within the same cluster 110 may be used for communication between the AIP 114 and all the processing engines 120 within the same cluster 110. In another embodiment, a multiplexer may be used to control communication between the AIP 114 and all the processing engines 120 within the same cluster 110. In yet another embodiment, a multiplexer may be used to control access to the bus shared by all the processing engines 120 within the same cluster 110 for communication with the AIP 114.

Figure 3B:
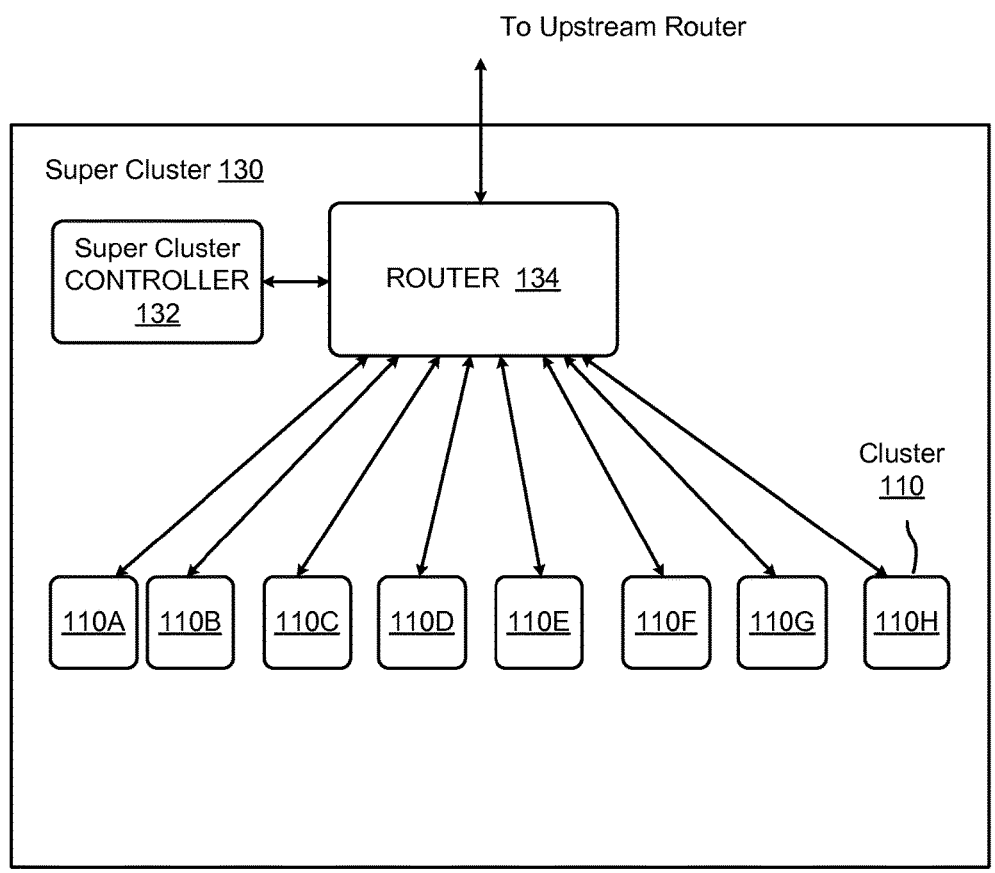
FIG. 3B is a block diagram of an exemplary super cluster according to the present disclosure.

The grouping of the processing engines 120 on a computing device 102 may have a hierarchy with multiple levels. For example, multiple clusters 110 may be grouped together to form a super cluster. FIG. 3B is a block diagram of an exemplary super cluster 130 according to the present disclosure. As shown on FIG. 3B, a plurality of clusters 110A through 110H may be grouped into an exemplary super cluster 130. Although 8 clusters are shown in the exemplary super cluster 130 on FIG. 3B, the exemplary super cluster 130 may comprise 2, 4, 8, 16, 32 or another number of clusters 110. The exemplary super cluster 130 may comprise a router 134 and a super cluster controller 132, in addition to the plurality of clusters 110. The router 134 may be configured to route packets among the clusters 110 and the super cluster controller 132 within the super cluster 130, and to and from resources outside the super cluster 130 via a link to an upstream router. In an embodiment in which the super cluster 130 may be used in a processing device 102A, the upstream router for the router 134 may be the top level router 104 of the processing device 102A and the router 134 may be an upstream router for the router 112 within the cluster 110. In one embodiment, the super cluster controller 132 may implement CCRs, may be configured to receive and send packets, and may implement a fixed-purpose state machine encapsulating packets and memory access to the CCRs, and the super cluster controller 132 may be implemented similar to the cluster controller 116. In another embodiment, the super cluster 130 may be implemented with just the router 134 and may not have a super cluster controller 132.

An exemplary cluster 110 according to the present disclosure may include 2, 4, 8, 16, 32 or another number of processing engines 120. FIG. 3A shows an example of a plurality of processing engines 120 that have been grouped into a cluster 110 and FIG. 3B shows an example of a plurality of clusters 110 that have been grouped into a super cluster 130. Grouping of processing engines is not limited to clusters or super clusters. In one embodiment, more than two levels of grouping may be implemented and each level may have its own router and controller.

Figure 4:
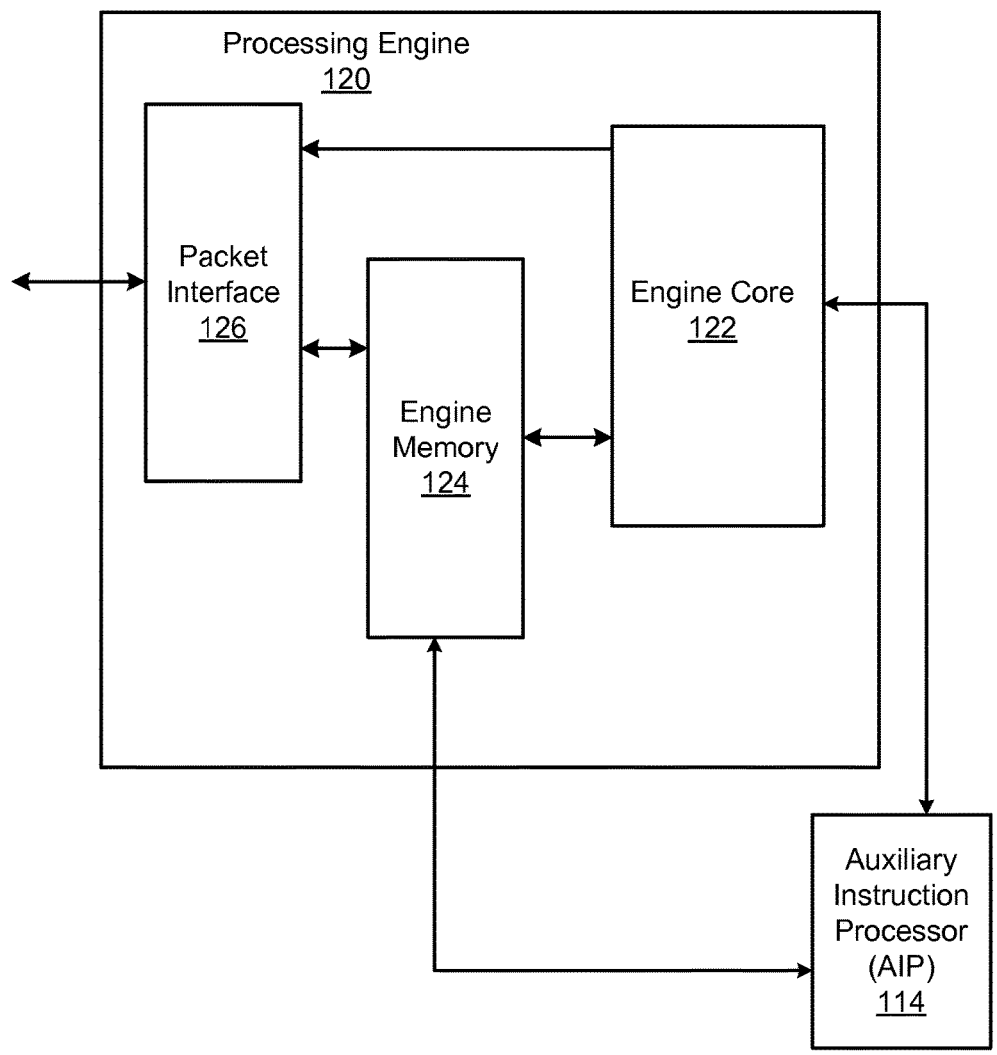
FIG. 4 is a block diagram of an exemplary processing engine according to the present disclosure.

FIG. 4 shows a block diagram of an exemplary processing engine 120 according to the present disclosure. As shown in FIG. 4, the processing engine 120 may comprise an engine core 122, an engine memory 124 and a packet interface 126. The processing engine 120 may be coupled to an AIP 114. As described herein, the AIP 114 may be shared by all processing engines 120 within a cluster 110. The processing core 122 may be a central processing unit (CPU) with an instruction set and may implement some or all features of modern CPUs, such as, for example, a multi-stage instruction pipeline, one or more arithmetic logic units (ALUs), a floating point unit (FPU) or any other existing or future-developed CPU technology. The instruction set may comprise one instruction set for the ALU to perform arithmetic and logic operations, and another instruction set for the FPU to perform floating point operations. In one embodiment, the FPU may be a completely separate execution unit containing a multi-stage, single-precision floating point pipeline. When an FPU instruction reaches the instruction pipeline of the processing engine 120, the instruction and its source operand(s) may be dispatched to the FPU.

The instructions of the instruction set may implement the arithmetic and logic operations and the floating point operations, such as those in the INTEL® x86 instruction set, using a syntax similar or different from the x86 instructions. In some embodiments, the instruction set may include customized instructions. For example, one or more instructions may be implemented according to the features of the computing system 100. In one example, one or more instructions may cause the processing engine executing the instructions to generate packets directly with system wide addressing. In another example, one or more instructions may have a memory address located anywhere in the computing system 100 as an operand. In such an example, a memory controller of the processing engine executing the instruction may generate packets according to the memory address being accessed.

The engine memory 124 may comprise a program memory, a register file comprising one or more general purpose registers, one or more special registers and one or more events registers. The program memory may be a physical memory for storing instructions to be executed by the processing core 122 and data to be operated upon by the instructions. In some embodiments, portions of the program memory may be disabled and powered down for energy savings. For example, a top half or a bottom half of the program memory may be disabled to save energy when executing a program small enough that less than half of the storage may be needed. The size of the program memory may be 1 thousand (1K), 2K, 3K, 4K, or any other number of storage units. The register file may comprise 128, 256, 512, 1024, or any other number of storage units. In one non-limiting example, the storage unit may be 32-bit wide, which may be referred to as a longword, and the program memory may comprise 2K 32-bit longwords and the register file may comprise 256 32-bit registers.

The register file may comprise one or more general purpose registers for the processing core 122. The general purpose registers may serve functions that are similar or identical to the general purpose registers of an x86 architecture CPU.

The special registers may be used for configuration, control and/or status. Exemplary special registers may include one or more of the following registers: a program counter, which may be used to point to the program memory address where the next instruction to be executed by the processing core 122 is stored; and a device identifier (DEVID) register storing the DEVID of the processing device 102.

In one exemplary embodiment, the register file may be implemented in two banks—one bank for odd addresses and one bank for even addresses—to permit fast access during operand fetching and storing. The even and odd banks may be selected based on the least-significant bit of the register address for if the computing system 100 is implemented in little endian or on the most-significant bit of the register address if the computing system 100 is implemented in big-endian.

The engine memory 124 may be part of the addressable memory space of the computing system 100. That is, any storage location of the program memory, any general purpose register of the register file, any special register of the plurality of special registers and any event register of the plurality of events registers may be assigned a memory address PADDR. Each processing engine 120 on a processing device 102 may be assigned an engine identifier (ENGINE ID), therefore, to access the engine memory 124, any addressable location of the engine memory 124 may be addressed by DEVID:CLSID:ENGINE ID: PADDR. In one embodiment, a packet addressed to an engine level memory location may include an address formed as DEVID:CLSID: ENGINE ID: EVENTS:PADDR, in which EVENTS may be one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits may be separate from the physical address being accessed.

The packet interface 126 may comprise a communication port for communicating packets of data. The communication port may be coupled to the router 112 and the cluster memory 118 of the local cluster. For any received packets, the packet interface 126 may directly pass them through to the engine memory 124. In some embodiments, a processing device 102 may implement two mechanisms to send a data packet to a processing engine 120. For example, a first mechanism may use a data packet with a read or write packet opcode. This data packet may be delivered to the packet interface 126 and handled by the packet interface 126 according to the packet opcode. The packet interface 126 may comprise a buffer to hold a plurality of storage units, for example, 1K, 2K, 4K, or 8K or any other number. In a second mechanism, the engine memory 124 may further comprise a register region to provide a write-only, inbound data interface, which may be referred to a mailbox. In one embodiment, the mailbox may comprise two storage units that each can hold one packet at a time. The processing engine 120 may have a event flag, which may be set when a packet has arrived at the mailbox to alert the processing engine 120 to retrieve and process the arrived packet. When this packet is being processed, another packet may be received in the other storage unit but any subsequent packets may be buffered at the sender, for example, the router 112 or the cluster memory 118, or any intermediate buffers.

In various embodiments, data request and delivery between different computing resources of the computing system 100 may be implemented by packets. FIG. 5 illustrates a block diagram of an exemplary packet 140 according to the present disclosure. As shown in FIG. 5, the packet 140 may comprise a header 142 and an optional payload 144. The header 142 may comprise a single address field, a packet opcode (POP) field and a size field. The single address field may indicate the address of the destination computing resource of the packet, which may be, for example, an address at a device controller level such as DEVID:PADDR, an address at a cluster level such as a physical address DEVID:CLSID:PADDR or a virtual address DEVID:CLSID:ADDR, or an address at a processing engine level such as DEVID:CLSID:ENGINE ID:PADDR or DEVID:CLSID:ENGINE ID:EVENTS: PADDR. The POP field may include a code to indicate an operation to be performed by the destination computing resource. Exemplary operations in the POP field may include read (to read data from the destination) and write (to write data (e.g., in the payload 144) to the destination).

In some embodiments, the exemplary operations in the POP field may further include bulk data transfer. For example, certain computing resources may implement a direct memory access (DMA) feature. Exemplary computing resources that implement DMA may include a cluster memory controller of each cluster memory 118, a memory controller of each engine memory 124, and a memory controller of each device controller 106. Any two computing resources that implemented the DMA may perform bulk data transfer between them using packets with a packet opcode for bulk data transfer.

In addition to bulk data transfer, in some embodiments, the exemplary operations in the POP field may further include transmission of unsolicited data. For example, any computing resource may generate a status report or incur an error during operation, the status or error may be reported to a destination using a packet with a packet opcode indicating that the payload 144 contains the source computing resource and the status or error data.

The POP field may be 2, 3, 4, 5 or any other number of bits wide. In some embodiments, the width of the POP field may be selected depending on the number of operations defined for packets in the computing system 100. Also, in some embodiments, a packet opcode value can have different meaning based on the type of the destination computer resources that receives it. By way of example and not limitation, for a three-bit POP field, a value 001 may be defined as a read operation for a processing engine 120 but a write operation for a cluster memory 118.

In some embodiments, the header 142 may further comprise an addressing mode field and an addressing level field. The addressing mode field may contain a value to indicate whether the single address field contains a physical address or a virtual address that may need to be converted to a physical address at a destination. The addressing level field may contain a value to indicate whether the destination is at a device, cluster memory or processing engine level.

The payload 144 of the packet 140 is optional. If a particular packet 140 does not include a payload 144, the size field of the header 142 may have a value of zero. In some embodiments, the payload 144 of the packet 140 may contain a return address. For example, if a packet is a read request, the return address for any data to be read may be contained in the payload 144.

Figure 6:
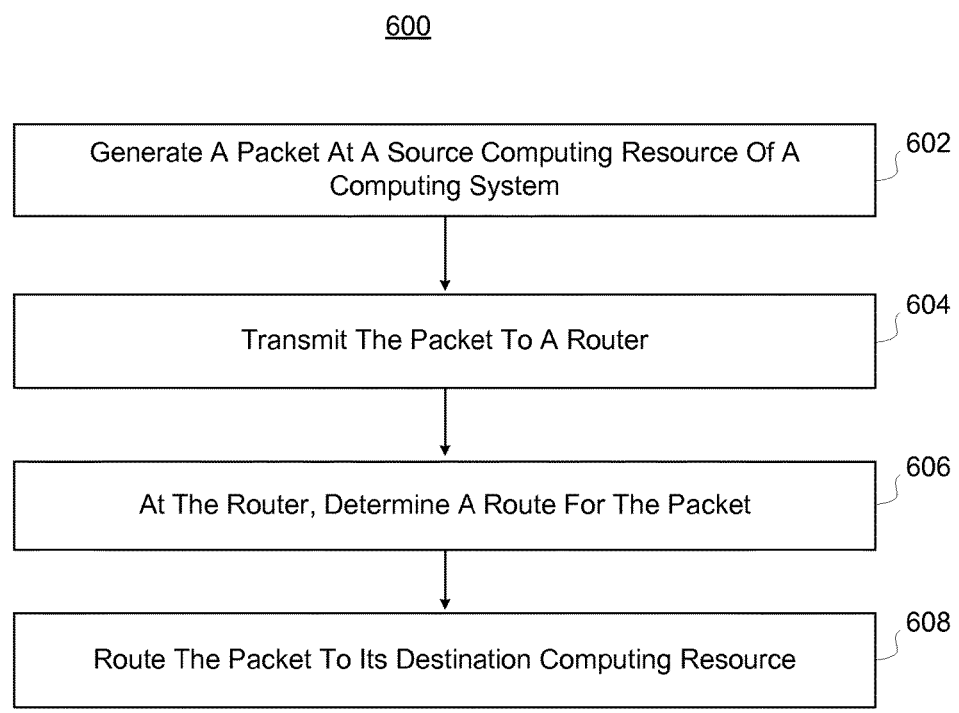
FIG. 6 is a flow diagram showing an exemplary process of addressing a computing resource using a packet according to the present disclosure.

FIG. 6 is a flow diagram showing an exemplary process 200 of addressing a computing resource using a packet according to the present disclosure. An exemplary embodiment of the computing system 100 may have one or more processing devices configured to execute some or all of the operations of exemplary process 600 in response to instructions stored electronically on an electronic storage medium. The one or more processing devices may include one or more devices configured through hardware, firmware, and/or software to be specifically designed for execution of one or more of the operations of exemplary process 600.

The exemplary process 600 may start with block 602, at which a packet may be generated at a source computing resource of the exemplary embodiment of the computing system 100. The source computing resource may be, for example, a device controller 106, a cluster controller 118, a super cluster controller 132 if super cluster is implemented, an AIP 114, a memory controller for a cluster memory 118, or a processing engine 120. The generated packet may be an exemplary embodiment of the packet 140 according to the present disclosure. From block 602, the exemplary process 600 may continue to the block 604, where the packet may be transmitted to an appropriate router based on the source computing resource that generated the packet. For example, if the source computing resource is a device controller 106, the generated packet may be transmitted to a top level router 104 of the local processing device 102; if the source computing resource is a cluster controller 116, the generated packet may be transmitted to a router 112 of the local cluster 110; if the source computing resource is a memory controller of the cluster memory 118, the generated packet may be transmitted to a router 112 of the local cluster 110, or a router downstream of the router 112 if there are multiple cluster memories 118 coupled together by the router downstream of the router 112; and if the source computing resource is a processing engine 120, the generated packet may be transmitted to a router of the local cluster 110 if the destination is outside the local cluster and to a memory controller of the cluster memory 118 of the local cluster 110 if the destination is within the local cluster.

At block 606, a route for the generated packet may be determined at the router. As described herein, the generated packet may comprise a header that includes a single destination address. The single destination address may be any addressable location of a uniform memory space of the computing system 100. The uniform memory space may be an addressable space that covers all memories and registers for each device controller, cluster controller, super cluster controller if super cluster is implemented, cluster memory and processing engine of the computing system 100. In some embodiments, the addressable location may be part of a destination computing resource of the computing system 100. The destination computing resource may be, for example, another device controller 106, another cluster controller 118, a memory controller for another cluster memory 118, or another processing engine 120, which is different from the source computing resource. The router that received the generated packet may determine the route for the generated packet based on the single destination address. At block 608, the generated packet may be routed to its destination computing resource.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A processing device, comprising:
a top level router comprising a plurality of high speed communication interfaces to communicate data to other devices external of the processing device;
a device controller coupled to the top level router to control operation of the top level router, the device controller comprising a microcontroller and a device controller memory space; and
a plurality of clusters of processing engines, each cluster having a cluster controller, a cluster memory and a plurality of processing engines, each cluster memory comprising a memory controller and each processing engine comprising an engine memory and an engine core,
wherein the device controller memory space, the cluster memory of all clusters of the processing device and the engine memory of all processing engines form a uniform address space on the processing device;

wherein the microcontroller of the device controller, each cluster controller, the memory controller of each cluster memory and each processing engine are configured to address any memory location within the uniform address space using a packet that contains a single destination address in a header of the packet.

2. The processing device of claim 1, wherein the device controller memory space comprises a plurality of registers and a memory to be used by the microcontroller.

3. The processing device of claim 1, wherein the engine memory comprises a plurality of registers and a memory to be used by the processing engine.

4. The processing device of claim 3, wherein each engine core is a computer processor core that has a multi-stage instruction pipeline, one or more arithmetic logic units (ALUs) and a floating point unit (FPU).

5. The processing device of claim 4, wherein the processing engine is configured to implement an instruction set that includes instructions to generate packets with system wide addressing for the destination address.

6. The processing device of claim 1, wherein each cluster memory comprises a memory controller that is configured to support accessing the cluster memory using a virtual address, the memory controller comprises a first register to store a first value to specify a width of the virtual address and a second register to store a base value for converting the virtual address to a physical address.

7. The processing device of claim 1, wherein the packet is addressed to a destination processing engine and contains at least one event flag to be set at the destination processing engine.

8. The processing device of claim 1, wherein the packet contains a packet opcode indicating an operation to be performed at its destination.

9. The processing device of claim 8, wherein the packet opcode indicates a read operation to be performed at the destination and a return address is in a payload of the packet.

10. A computing system, comprising:
a plurality of processing devices, each processing device comprising:
a top level router comprising a plurality of high speed communication interfaces to couple the processing device with one or more other processing devices of the computing system;
a device controller coupled to the top level router to control operation of the top level router, the device controller comprising a microcontroller and a device controller memory space; and
a plurality of clusters of processing engines, each cluster having a cluster controller, a cluster memory and a plurality of processing engines, each cluster memory comprising a memory controller and each processing engine comprising an engine memory and an engine core,
wherein the device controller memory space of each of the plurality of processing devices, the cluster memory of all clusters of each of the plurality of processing devices, the memory controller of each cluster memory and the engine memory of all processing engines of each of the plurality of processing devices form a uniform address space for the computing system;
wherein the microcontroller of the device controller of each of the plurality of processing devices, each cluster controller of each of the plurality of processing devices, and each processing engine of each of the plurality of processing devices are configured to address any memory location within the uniform address space using a packet that contains a single destination address in a header of the packet.

11. The computing system of claim 10, wherein the device controller memory space of each of the plurality of processing devices comprises a plurality of registers and a memory to be used by the microcontroller.

12. The computing system of claim 10, wherein the engine memory of each processing engine of each of the plurality of processing devices comprises a plurality of registers and a memory to be used by the respective processing engine.

13. The computing system of claim 12, wherein each engine core is a computer processor core that has a multi-stage instruction pipeline, one or more arithmetic logic units (ALUs) and a floating point unit (FPU).

14. The computing system of claim 13, wherein each processing engine of each of the plurality of processing devices is configured to implement an instruction set that includes instructions to generate packets with system wide addressing for the destination address.

15. The computing system of claim 10, wherein each cluster memory of each of the plurality of processing devices comprises a memory controller that is configured to support accessing the cluster memory using a virtual address, the respective memory controller comprises a first register to store a first value to specify a width of the virtual address and a second register to store a base value for converting the virtual address to a physical address.

16. The computing system of claim 10, wherein the packet is addressed to a destination processing engine and contains at least one event flag to be set at the destination processing engine.

17. The computing system of claim 10, wherein the packet contains a packet opcode indicating an operation to be performed at its destination.

18. The computing system of claim 17, wherein the packet opcode indicates a read operation to be performed at the destination and a return address is in a payload of the packet.

19. A computer-implemented method for addressing a computing resource in a computing system using a packet, comprising:
generating a packet at a source computing resource of the computing system, the computing system comprising a plurality of processing devices, each processing device comprising:
a top level router comprising a plurality of high speed communication interfaces to communicate data to one or more other processing devices of the computing system;
a device controller coupled to the top level router to control operation of the top level router, the device controller comprising a microcontroller and a device controller memory space; and
a plurality of clusters of processing engines, each cluster having a cluster controller, a cluster memory and a plurality of processing engines, each processing engine comprising an engine memory and an engine core,
wherein the source processing device is one of:
a microcontroller of the device controller of one of the plurality of processing devices, a cluster controller of a cluster of one of the plurality of processing devices, a memory controller of a cluster of one of the plurality of processing devices, or a processing engine; transmitting the packet to a router;

determining a route for the packet at the router, wherein the packet contains a single destination address in a header of the packet and the route is determined based on the single destination address, the destination address points to an address location in a uniform address space of the computing system, the uniform address space comprises the device controller memory space of each of the plurality of processing devices, the cluster memory of all clusters of each of the plurality of processing devices and the engine memory of all processing engines of each of the plurality of processing devices; and routing the packet to its destination computing resource of the computing system.

20. The computer-implemented method of claim 19, wherein the packet contains a packet opcode indicating an operation to be performed at its destination.

* * * * *